(12) United States Patent
Chang

(10) Patent No.: US 7,461,801 B2
(45) Date of Patent: Dec. 9, 2008

(54) MULTI-FUNCTIONAL FOOD PROCESSOR

(75) Inventor: Li-Chen Wu Chang, Taoyuan Hsien (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 92 days.

(21) Appl. No.: 11/620,051

(22) Filed: Jan. 5, 2007

(65) Prior Publication Data
US 2008/0164350 A1 Jul. 10, 2008

(51) Int. Cl.
*A47J 43/046* (2006.01)
(52) U.S. Cl. .................... 241/37.5; 99/537; 241/92; 241/101.1; 241/282.1
(58) Field of Classification Search .............. 241/282.1, 241/282.2, 92, 37.5, 101.1; 99/537
See application file for complete search history.

(56) References Cited

U.S. PATENT DOCUMENTS 2,678,073 A * 5/1954 De Nardis ............... 241/92
5,308,002 A * 5/1994 Pereira ..................... 241/92
5,921,485 A * 7/1999 Plavcan et al. ........... 241/282.2

* cited by examiner

*Primary Examiner*—Mark Rosenbaum

(57) ABSTRACT

A multi-functional food processor contains a machine body and a top cover. It further includes a container and a driving device. The drive shaft of the driving device is extended to the container, and a juicer shredder, a vegetable shredder or a meat grinder blade is selectively installed in the transmission shaft, which is connected to the drive shaft. The top cover is provided with two feed tubes, where the first feed tube is used for feeding vegetables and fruits in conjunction with a first pusher. The second feed tube is used for feeding vegetables or meat into a vegetable shredder or a meat grinder blade in conjunction with push of the second pusher. A safety switch is mounted between the feed tubes, and it allows only one pusher to operate in each sole feed tube thus avoiding the food being fed into the wrong feed tube.

10 Claims, 8 Drawing Sheets

MULTI-FUNCTIONAL FOOD PROCESSOR

BACKGROUND OF THE INVENTION

1. Field of the Invention

The present invention relates generally to a food processor with multi-functional capabilities such as juice extraction, dicing vegetables, and grinding meat, etc.

2. The Prior Arts

A conventional food processor normally has only one single function. If more functions are needed to be added on to it, its total volume will accordingly be increased substantially due to housing more components to be contained in the body of the food processor, and thus will also cost more to manufacture. For example, a conventional juicer has the sole function of extracting juice, and does not possess the capabilities for shredding vegetables and grinding meat. If a food processor is required to have the three previously-mentioned functions simultaneously, three different forms of shredding/slicing tools must be installed in the food processor body thereof, which thus makes the total size of the entire food processor to be gigantic and relatively heavy.

Moreover, conventional food processors provide only a single feed tube. If different food materials need to be processed, the top cover of the feed tube in different locations is required to be changed. The reason for this is that the food is placed at the center of the shredding/slicing disk when performing juice extraction as the food is being cut and grinded; therefore, the feed tube is commonly formed on the top cover located at the center portion corresponding to the center of the shredding/slicing tools, while the feed tube is commonly installed at a region further away from the center of the shredding/slicing tools when dicing vegetables or grinding meat, due to the centrifugal effect and the requirement of being cut by the knife-edge so as to allow the vegetables and meat to be easily cut after they fall into the container through the feed tube. Meanwhile, the vegetable shredder needs to be in a suspended state for allowing the food material to fall underneath the vegetable shredder. Additionally, the cutting/shredding/slicing tools of the conventional juicer as well as the sole feed tube at the top cover both could not be changed, thus, its function is rather limited. If the user requires to use different shredding/slicing functions, different top covers or different machines must be used, thus causing inconvenience in usage.

SUMMARY OF THE INVENTION

A primary objective of the present invention is to provide a multi-functional food processor, which resolves the drawbacks of conventional designs that have more complicated structures and higher manufacturing costs due to having added functions.

One characteristic of the present invention is that the multi-functional food processor is based on the structure of conventional juicer, and having several designed interchangeable cutting/shredding/slicing tools for different purposes, thus allowing the user to choose the proper tool according to the food material that is needed to be shred/sliced.

Another characteristic of the present invention is that two feed tubes are provided at the top cover of the multi-functional food processor; where one of which is used for feeding vegetables and for use in juice extraction incorporating the juicer cutting/shredding tools; the other feed tube is used for feeding vegetables or meat, and to cut vegetables or grind meat respectively in conjunction with the juicer shredder or the meat grinder blade.

Another characteristic of the present invention is that the two feed tubes are respectively configured to possess different sizes of inside diameters, and are respectively matched with pushers having different sizes of outside diameters. The two pushers could not extend into the other feed tube except for the feed tube of which it is corresponding to, thereby avoiding operational mistakes.

Another characteristic of the present invention is that a safety switch is mounted between the two feed tubes, where the two "pushers" respectively extend into the two feed tubes, by using the safety switch, one of the pushers may be fixed at the feed tube where it is located, and only the other pusher is operable in order to avoid food being fed into the wrong feed tube.

Based on the aforementioned, the multi-functional food processor of the present invention comprises a machine body and a top cover disposed over the machine body; the machine body further comprise a container and a driving device under the container; the drive shaft of the driving device extending to the container may selectively install a shredding/slicing accessory, or assemble another shredding/slicing tool in the transmission shaft after which the drive shaft is connected to the transmission shaft; for example, a juicer shredder may be directly installed to the drive shaft; or after the drive shaft is connected to a transmission shaft, then a vegetable shredding blade or meat grinder blade is assembled to the transmission shaft, thus providing the slicing/shredding of different food materials; the aforementioned top cover is provided with a first feed tube and a second feed tube, in which the first tube is used for feeding vegetables and fruit to be used in conjunction with the push of the first pusher for extracting juice using the juicer shredding blade; the second feed tube is used for feeding vegetables or meat, and for shredding vegetables using the vegetable shredder or for grinding meat using the meat grinder blade in conjunction with the push of the second pusher.

The safety switch mounted between the first feed tube and the second feed tube is provided with a first protruding key and a second protruding key. By rotating the safety switch, the first protruding key is allowed to be extended into the first feed tube, and is thereby engaged with the first pusher; or the second protruding key is allowed to be extended into the second feed tube and is thereby engaged with the second pusher.

Moreover, the present invention provides a first pusher with an adjustable length thereof; when juice extraction is required to be performed, the first pusher may be integrated into a longer length for pushing the vegetables and fruit to the juicer shredding blade disposed inside a deeper region; while when vegetable shredding or meat grinding is required to be performed, due to the higher displacement of the vegetable shredder or the meat grinder blade, the first pusher may be first shortened and then fixed inside the first feed tube, and using only the second pusher, the vegetables or meat is pushed to the vegetable shredder or the meat cutting/grinder blade.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
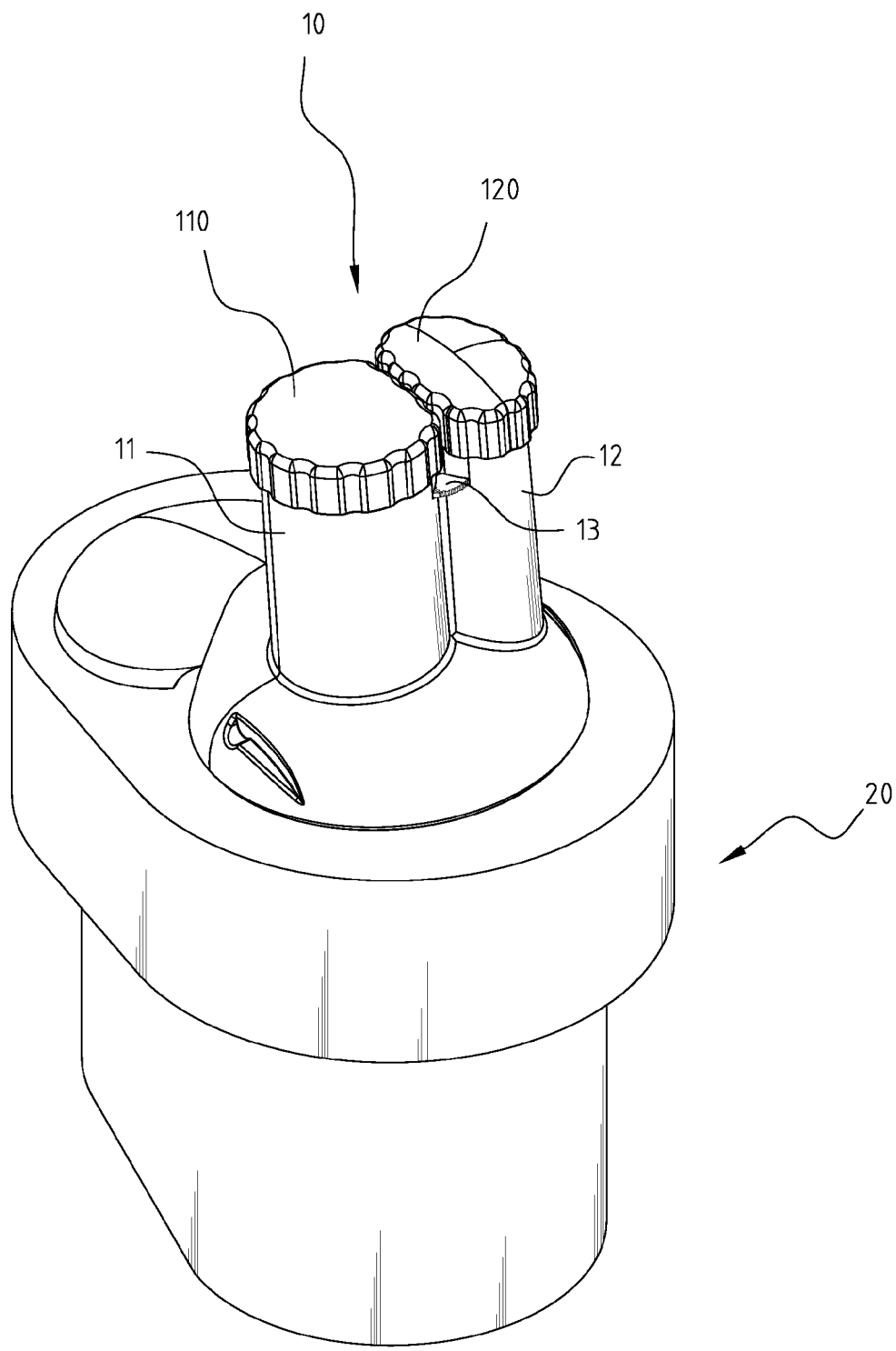
FIG. 1 is a perspective assembled view showing a multi-functional food processor in accordance with the present invention.
Figure 4:
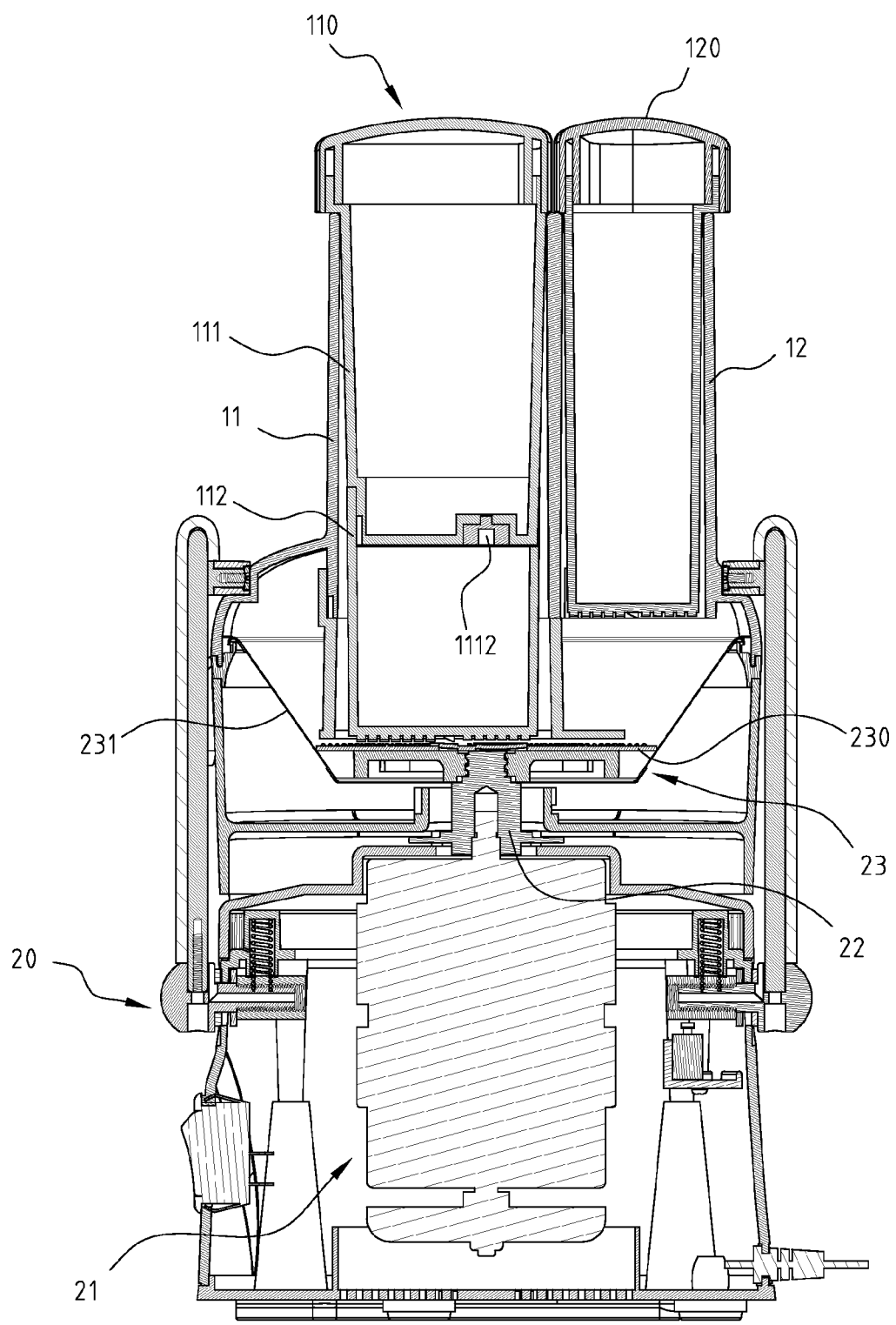
FIG. 4 is a side sectional view showing the multi-functional food processor in accordance with a first embodiment of the present invention.

With reference to the drawings and in particular to FIG. 1 and FIG. 4, a multi-functional food processor constructed in accordance with the present invention includes a machine body 20 and a top cover 10 mounted on the machine body 20, in which a first feed tube 11 and a second feed tube 12 are adjacently disposed at the top cover 10, the hollow first feed tube 11 is extended into a first pusher 110, the hollow second feed tube 12 is extended into a second pusher 120, and a safety switch 13 is mounted between the first feed tube 11 and the second feed tube 12.

The machine body 20 includes a container above it, and a driving device 21 under the container. The driving device 21 is assembled with a drive shaft 22 extending upwards to the container, and a cutting device 23 may be mounted on the drive shaft 22. The cutting device 23 includes a transmission shaft 232 (refer to FIG. 5) and a plurality of cutting tools. One or more of the cutting/shredding tools may be directly installed onto the drive shaft 22. The other cutting tools may be installed to the transmission shaft 232, and then to connect the transmission shaft 232 to the drive shaft 22. For example, the cutting tools may comprise a juicer shredder 230 (refer to FIG. 4), a vegetable shredder 233 (refer to FIG. 5) and a meat grinder blade 234 (refer to FIG. 6); the transmission shaft 232 and the juicer shredder 230 may be respectively directly installed to the drive shaft 22; the vegetable shredder 233 and the meat grinder blade 234 may be respectively installed to the transmission shaft 232. The upper end of the transmission shaft 232 is assembled with a locating protruding portion 235, and the lower end thereof may be locked to the drive shaft 22. The top cover 10 includes the first feed tube 11 and the second feed tube 12. When the top cover 10 is mounted on the machine body 20, the first feed tube 11 is near to the center of the driving device 21 in axial direction, and the second feed tube 12 is away from the center of the driving device 21 in axial direction as compared to the first feed tube 11. The first feed tube 11 and the second feed tube 12 respectively are extended into the first pusher 110 and the second pusher 120.

Figure 2A:
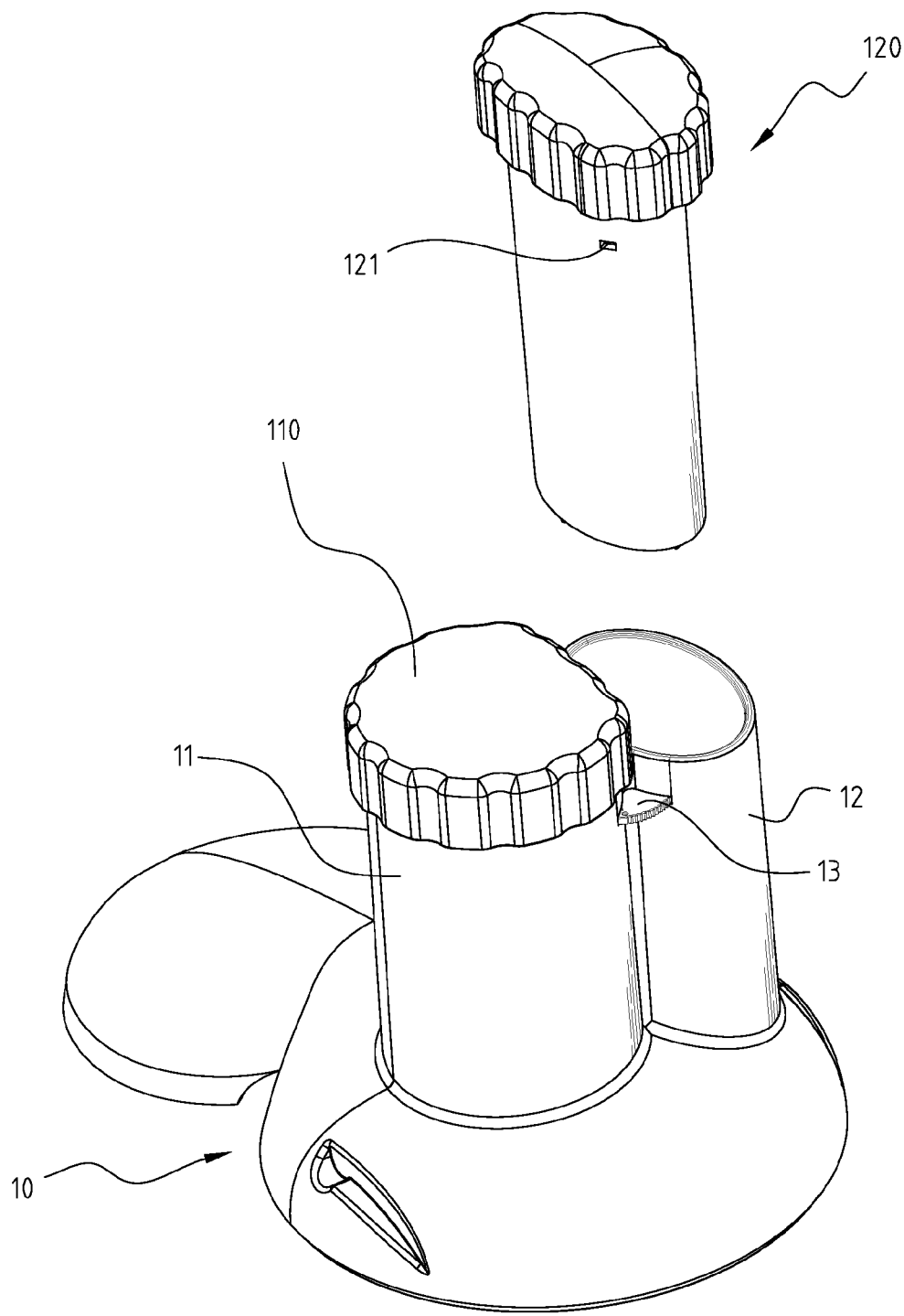
FIG. 2A is a perspective exploded view showing a top cover and a second pusher of a multi-functional food processor in accordance with the present invention.
Figure 2B:
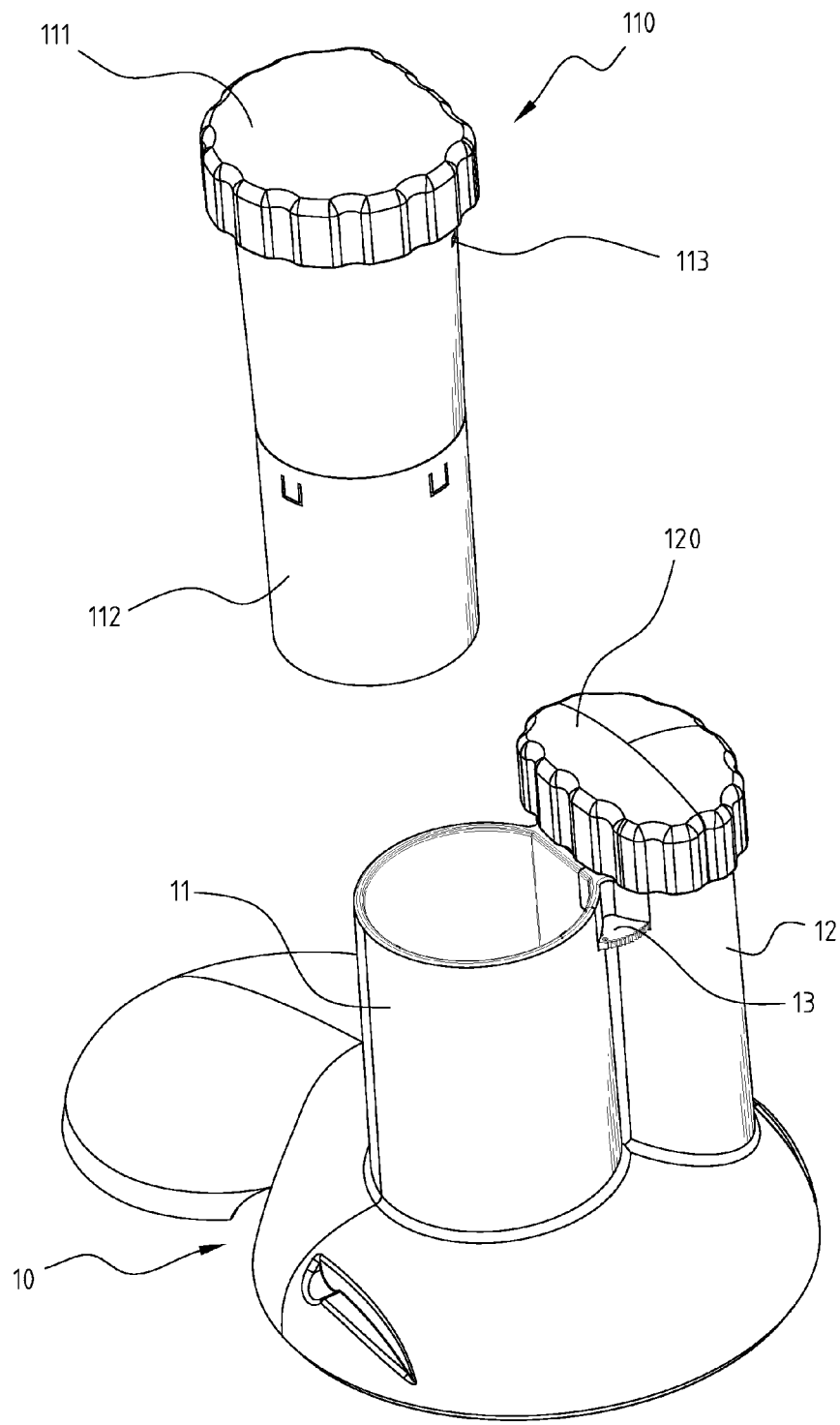
FIG. 2B is a perspective exploded view showing the top cover and a first pusher of the multi-functional food processor in accordance with the present invention.
Figure 2C:
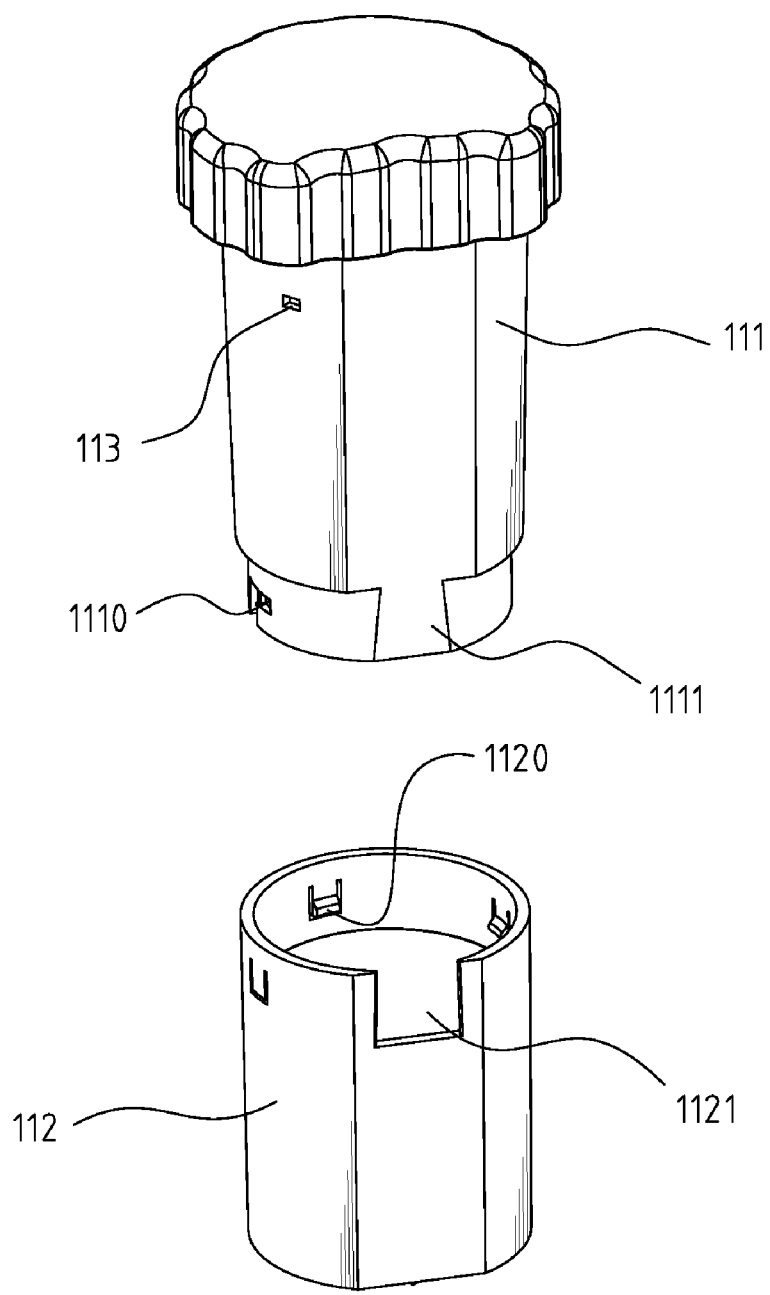
FIG. 2C is a perspective exploded view showing the assembling of the components for the first pusher in accordance with the present invention.

Referring to FIG. 2A, FIG. 2A shows a preferred embodiment of the second pusher 120. A second slot 121 is disposed on the surface of the side wall of the second pusher 120. Referring to FIG. 2B and FIG. 2C, the first pusher 110 includes an upper portion 111 and a lower portion 112. A first slot 113 is formed on an appropriate location on the surface of the upper portion 111; an inside diameter is formed at the upper end of the lower portion 112, and an outside diameter corresponding to the aforementioned inside diameter is formed at the lower end of the upper portion 111. A plurality of latch holes 1110 may be formed on the outside diameter, and a plurality of elastic latches 1120 corresponding to the latch holes 1110 may be formed on the inside diameter. The elastic latches 1120 are mated with the latch holes 1110 to integrate the upper portion 111 and the lower portion 112 into the intact first pusher 110 when the outside diameter and the inside diameter are joined together. A locating indented hole 1112 (refer to FIG. 4) for fixing the locating protruding portion 235 of the transmission shaft 232 may be formed on the bottom surface of the upper portion 111. A keyed portion 1111 (refer to FIG. 2C) may be further formed at the outside diameter surface of the lower end of the upper portion 111, and a notch 1121 corresponding to the keyed portion 1111 is disposed at the side wall of the upper edge of the lower portion 112. The position where the keyed portion 1111 corresponds to the notch 1121 is the very position that the elastic latches 1120 are corresponding to the latch holes 1110 by means of guiding with the keyed portion 1111 and the notch 1121, where the elastic latches 1120 are allowed to mate with the latch holes 1110 easily.

Figure 3:
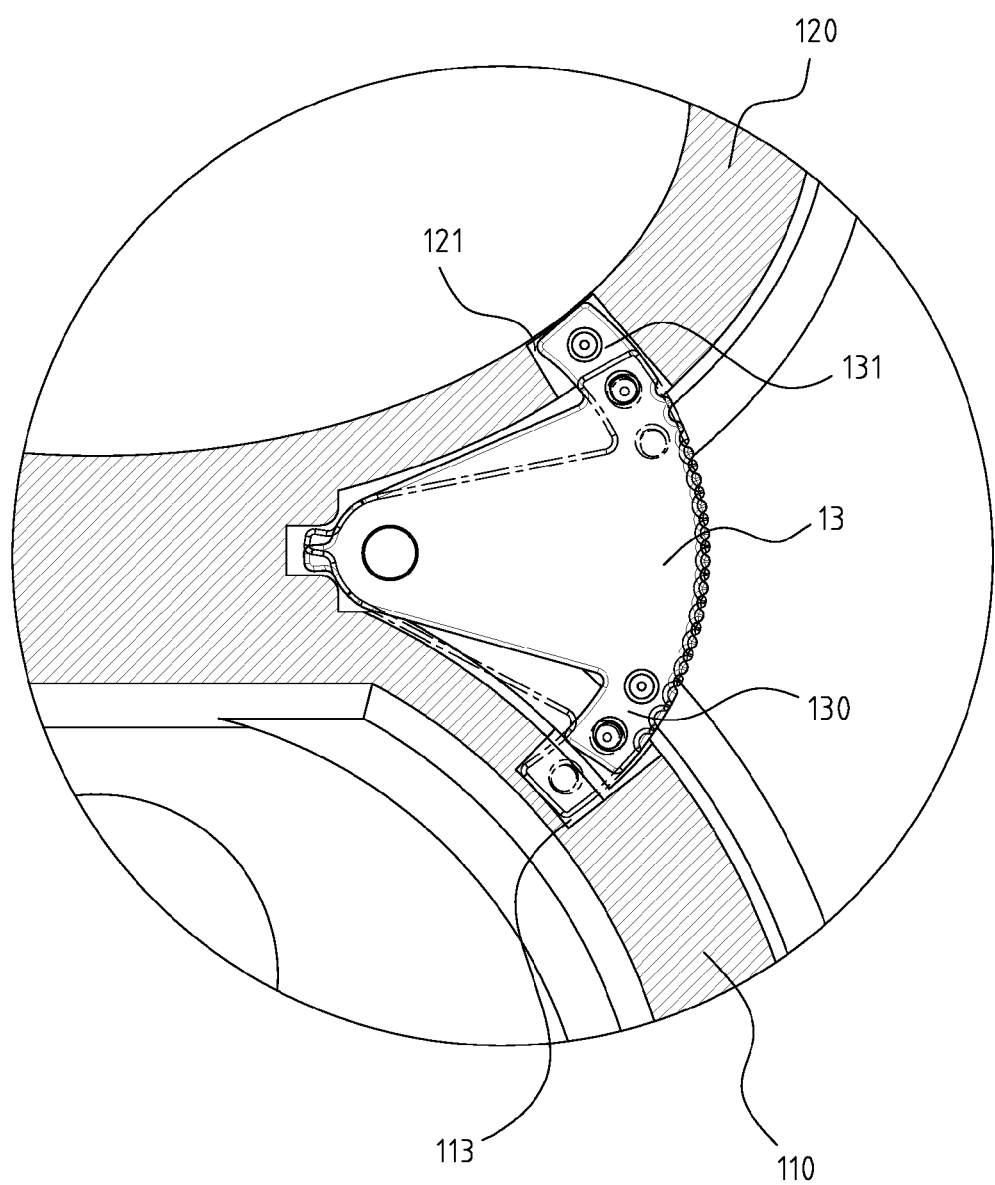
FIG. 3 is a partial enlarged sectional view showing a safety switch on the top cover of the multi-functional food processor in accordance with the present invention.

Also referring to FIG. 3, FIG. 3 shows a preferred embodiment of the safety switch 13 in accordance with the present invention. The safety switch 13 is mounted between the first feed tube 11 and the second feed tube 12 through a pivot. A first protruding key 130 and a second protruding key 131 are respectively disposed on the two sides of the safety switch 13. A first mounting hole and a second mounting hole are respectively formed on the side wall of the first feed tube 11 and the second feed tube 12; and the first protruding key 130 and a second protruding key 131 are respectively corresponding to the first mounting hole and the second mounting hole. The first slot 113 on the surface of the first pusher 110 may allow the first protruding key 130 to engage with, and the second slot 121 on the surface of the second pusher 120 may allow the second protruding key 131 to engage with. After the first pusher 110 and the second pusher 120 are respectively extended into the first feed tube 11 and the second feed tube 12 entirely, the first slot 113 and the second slot 121 are respectively corresponded to the first mounting hole and the second mounting hole. When the safety switch 13 is rotated around the coupling joint, the first protruding key 130 is allowed to be engaged with the first slot 113 through the first mounting hole, thereby disallowing the first pusher 110 to be pulled out, or allowing the second protruding key 131 to be engaged with the second slot 121 through the second mounting hole, thereby disallowing the second pusher 120 to be pulled out.

Additionally, a preferred embodiment of the present invention allows the first feed tube 11 and the second feed tube 12 to respectively have different sizes of inside diameters, thereby allowing the first pusher 110 and the second pusher 120 to be able to extend only into the first feed tube 11 and the second feed tube 12, respectively, thus avoiding operating error.

Also referring to FIG. 4, in the case that the present invention is used as a juicer, a filter mesh is first installed to the rear of the container of the machine body 20, and then the juicer shredder 230 is directly installed to the drive shaft 22. At this time, the upper portion 111 and the lower portion 112 of the first pusher 110 are integrated in becoming one long pusher, and the user needs to turn the safety switch 13 to allow the second protruding key 131 to engage with the second slot 121 of the second pusher 120, thereby making the first pusher 110 extending into the first feed tube 11 only after the first protruding key 130 is moved out from the inside diameter of the first feed tube 11, thus to push the vegetables and fruit for extracting the juice.

Figure 5:
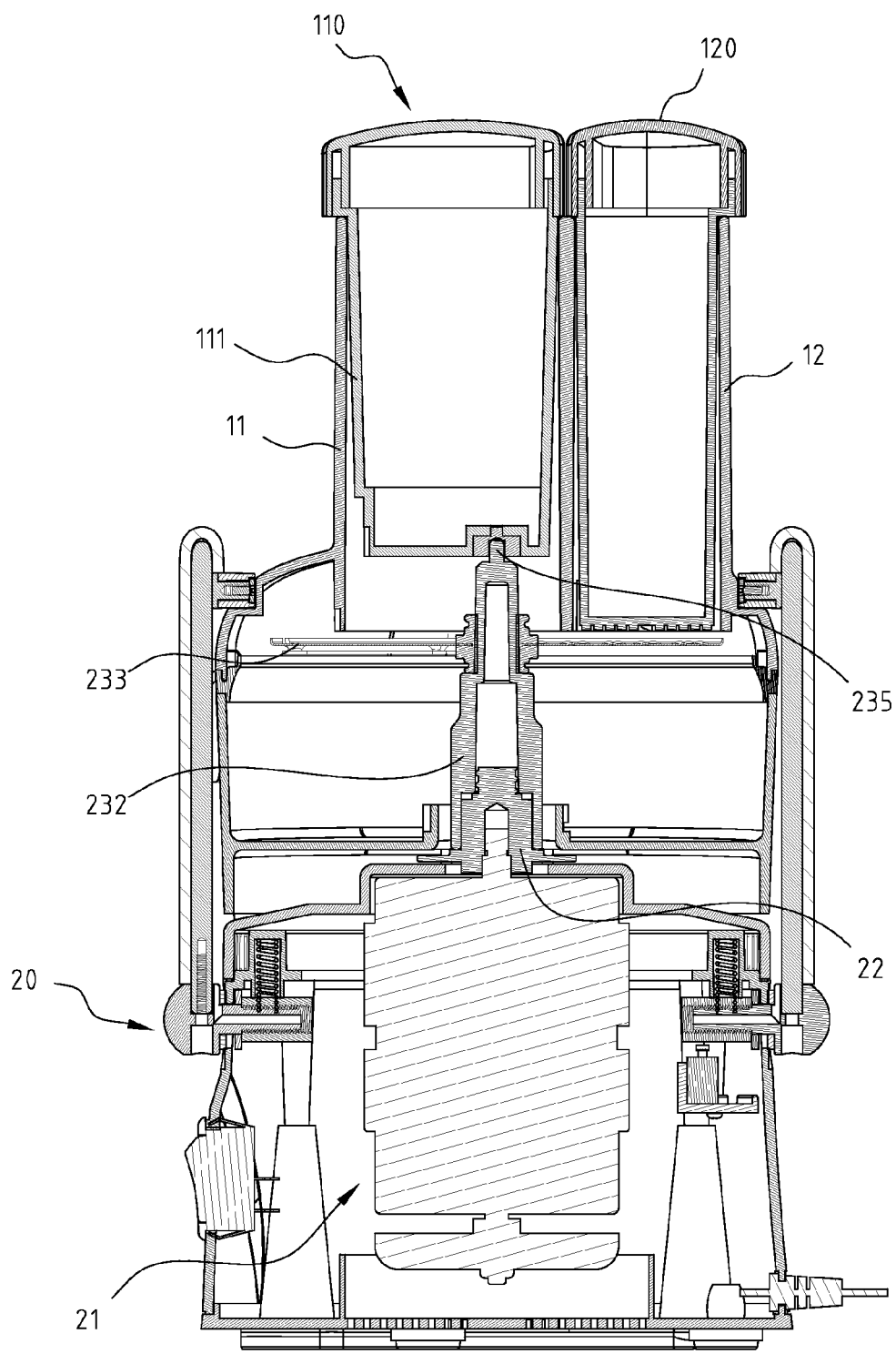
FIG. 5 is a side sectional view showing the multi-functional food processor in accordance with a second embodiment of the present invention.

Also referring to FIG. 5, in the case that the present invention is used as a shredder, the filter mesh and the juicer shredder should first be removed, and then the transmission shaft 232 is installed onto the drive shaft 22, and the vegetable shredder 233 is installed onto the transmission shaft 232. At this time, since the vegetable shredder 233 is located at the upper part of the transmission shaft 232, the upper portion 111 and the lower portion 112 of the first pusher 110 therefore must be detached, and only the upper portion 111 is extended into the first feed tube 11. At the same time, the locating protruding portion 235 on the upper end of the transmission shaft 232 is engaged with the locating indented hole 1112 on the bottom surface of the upper portion 111 to avoid the wobbling of the vegetable shredder 233; and the safety switch 13 should be rotated by the user to make the first protruding key 130 to be engaged with the first slot 113 of the upper portion 111, thus allowing the second pusher 120 to extend into the second feed tube 12 only after the second protruding key 131 is moved out from the inside diameter of the second feed tube 12, so as to push the vegetables to perform shredding.

Figure 6:
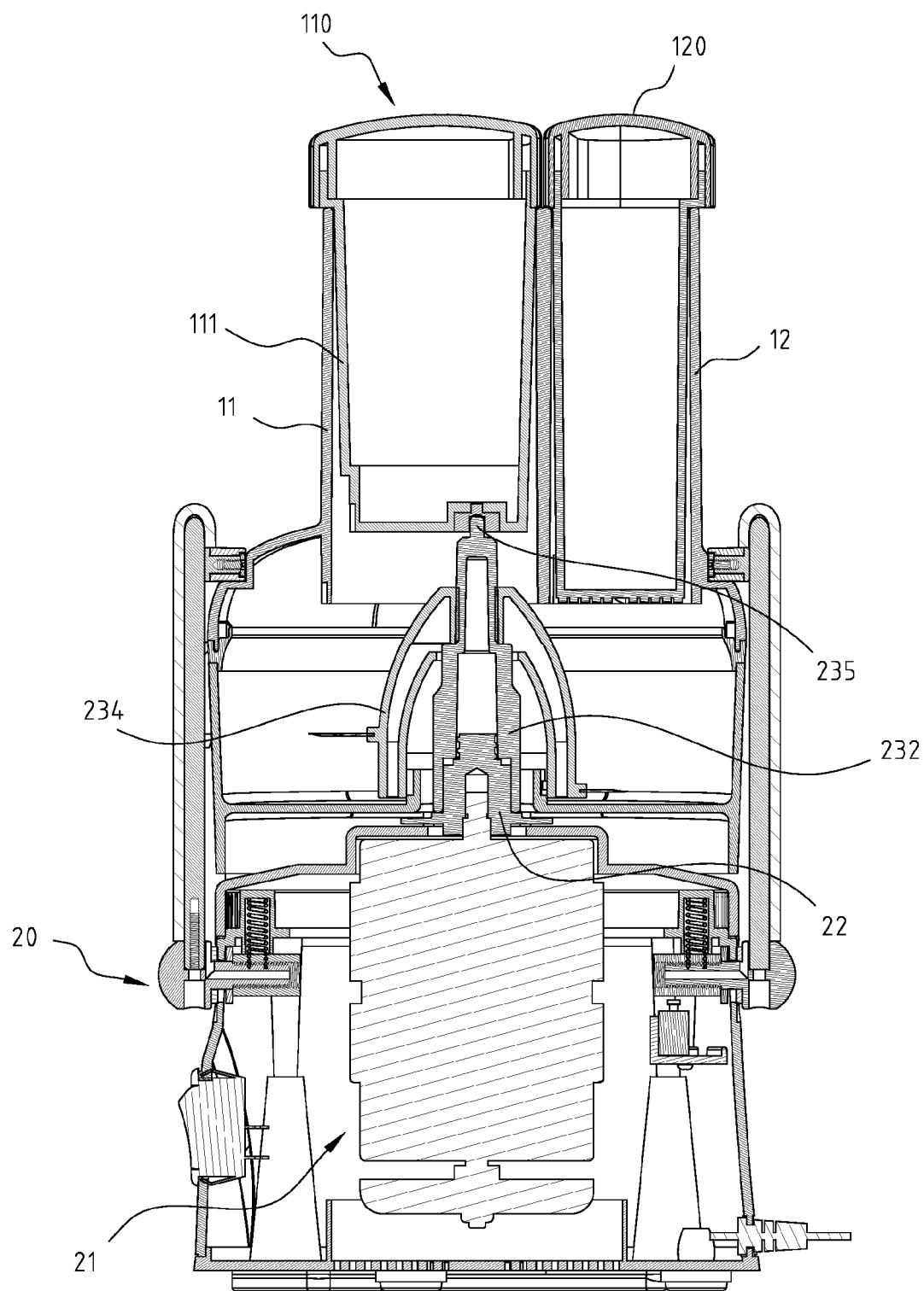
FIG. 6 is a side sectional view showing the multi-functional food processor in accordance with a third embodiment of the present invention.

Also referring to FIG. 6, in the case that the present invention is used as a meat grinder, the meat grinder blade 234 is installed onto the transmission shaft 232. The installation method of the meat grinder blade 234 is the same as that of the vegetable shredder mentioned above, with only the upper portion 111 to be extended into the first feed tube 11. At the same time, the locating protruding portion 235 on the upper end of the transmission shaft 232 is engaged with the locating indented hole 1112 on the bottom surface of the upper portion 111 for avoiding the wobbling of the meat grinder blade 234; and the safety switch 13 should be turned by the user to make the first protruding key 130 to be engaged with the first slot 113 of the upper portion 111, thus allowing the second pusher 120 to extend into the second feed tube 12 only after the second protruding key 131 is moved out from the inside diameter of the second feed tube 12, so as to push the meat for grinding.

Foregoing detailed description of the preferred embodiment is used for further understand the feature and sprit of the present invention, not to limit the scope of the present invention. It should be appreciated that there are many modifications and substitutions without departing from the spirit and the scope of the present invention which is defined by the appended claims.

What is claimed is:

1. A multi-functional food processor, comprising:
 a machine body, including:
  a container, located above the machine body, and
  a driving device, located below the container and having a drive shaft extending to the inside of the container;
 a shredding/slicing device, including a transmission shaft and a plurality of cutting tools, wherein the transmission shaft and one of the cutting tools is to be directly installed onto the drive shaft, and another of the cutting tools is to be installed onto the transmission shaft;
 a top cover, including a first feed tube and a second feed tube, wherein the top cover is mounted on the machine body, and the first feed tube is near the center of the driving device in axial direction, and the second feed tube is away from the center of the driving device in axial direction in comparison to the first feed tube;
 a first pusher to be extended into the first feed tube; and
 a second pusher to be extended into the second feed tube;
 wherein the side walls of the first feed tube and the second feed tube are respectively configured with a first mounting hole and a second mounting hole, a safety switch with a first protruding key and a second protruding key mounted between the first feed tube and the second feed tube, and the first protruding key and the second protruding key are respectively corresponding to the first mounting hole and the second mounting hole, a first slot on the surface of the first pusher is for formed for the first protruding key to engage with, and a second slot on the surface of the second pusher is formed for the second protruding key to engage with; after the first pusher and the second pusher respectively extend into the first feed tube and the second feed tube entirely, the first slot and the second slot correspond to the first mounting hole and the second mounting hole, respectively; and when the safety switch rotates around a coupling joint, the first protruding key is engaged with the first slot through the first mounting hole, or the second protruding key is engaged with the second slot through the second mounting hole.

2. The multi-functional food processor as claimed in claim 1, wherein the first feed tube and the second feed tube have different sizes of inside diameters, respectively; and the first pusher and the second pusher only extend into the first feed tube and the second feed tube, respectively.

3. The multi-functional food processor as claimed in claim 2, wherein the first pusher further includes an upper portion and a lower portion to be integrated or detached to each other.

4. The multi-functional food processor as claimed in claim 3, wherein an inside diameter is formed at an upper end of the lower portion, and an outside diameter corresponding to the inside diameter is formed at a lower end of the upper portion, a plurality of latch holes are formed on the outside diameter, and a plurality of elastic latches corresponding to the latch holes are formed on the inside diameter; the elastic latches are mated with the latch holes when the outside diameter and the inside diameter are joined together.

5. The multi-functional food processor as claimed in claim 4, wherein a keyed portion is formed at the outside diameter surface of the lower end of the upper portion, and a notch corresponding to the keyed portion is disposed at the side wall of an upper edge of the lower portion with the keyed portion matching the notch when the elastic latches mate with the latch holes.

6. The multi-functional food processor as claimed in claim 1, wherein the first pusher further includes an upper portion and a lower portion to be integrated or detached to each other.

7. The multi-functional food processor as claimed in claim 1, wherein the cutting tools include a juicer shredder, a vegetable shredder, and a meat grinder blade.

8. A multi-functional food processor, comprising:
 a machine body, including:
  a container, located above the machine body, and
  a driving device, located below the container and having a drive shaft extending to the inside of the container;
 a shredding/slicing device, including a transmission shaft and a plurality of cutting tools, wherein the transmission shaft and one of the cutting tools is to be directly installed onto the drive shaft, and another of the cutting tools is to be installed onto the transmission shaft;
 a top cover, including a first feed tube and a second feed tube, wherein the top cover is mounted on the machine body, and the first feed tube is near the center of the driving device in axial direction, and the second feed tube is away from the center of the driving device in axial direction in comparison to the first feed tube;

a first pusher to be extended into the first feed tube; and a second pusher to be extended into the second feed tube;

wherein the first pusher further includes an upper portion and a lower portion, an inside diameter is formed at an upper end of the lower portion, and an outside diameter corresponding to the inside diameter is formed at a lower end of the upper portion; a plurality of latch holes are formed on the outside diameter, and a plurality of elastic latches corresponding to the latch holes are formed on the inside diameter; the elastic latches are mated with the latch holes when the outside diameter and the inside diameter are joined together.

9. The multi-functional food processor as claimed in claim 8, wherein a keyed portion is formed at the outside diameter surface of the lower end of the upper portion, and a notch corresponding to the keyed portion is disposed at the side wall of an upper edge of the lower portion with the keyed portion matching the notch when the elastic latches mate with the latch holes.

10. A multi-functional food processor, comprising:

a machine body, including:

a container, located above the machine body, and a driving device, located below the container and having a drive shaft extending to the inside of the container;

a shredding/slicing device, including a transmission shaft and a plurality of cutting tools, wherein the transmission shaft and one of the cutting tools is to be directly installed onto the drive shaft, and another of the cutting tools is to be installed onto the transmission shaft;

a top cover, including a first feed tube and a second feed tube, wherein the top cover is mounted on the machine body, and the first feed tube is near the center of the driving device in axial direction, and the second feed tube is away from the center of the driving device in axial direction in comparison to the first feed tube;

a first pusher to be extended into the first feed tube; and a second pusher to be extended into the second feed tube;

wherein the first pusher further includes an upper portion and a lower portion, a locating protruding portion is formed on an upper end of the transmission shaft, and a locating indented hole corresponding to the locating protruding portion is formed on a bottom surface of the upper portion; when the transmission shaft is assembled on the drive shaft and the upper portion extends entirely into the first feed tube, the locating protruding portion is engaged with the locating indented hole.

* * * * *